(12) United States Patent
Lim

(10) Patent No.: US 7,717,602 B2
(45) Date of Patent: May 18, 2010

(54) EXTERNAL ELECTRODE FLUORESCENT LAMP, METHOD OF FABRICATING THE SAME AND LIQUID CRYSTAL DISPLAY DEVICE HAVING THE SAME

(75) Inventor: Dae-San Lim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 121 days.

(21) Appl. No.: 11/166,916

(22) Filed: Jun. 27, 2005

(65) Prior Publication Data

US 2006/0126332 A1   Jun. 15, 2006

(30) Foreign Application Priority Data

Dec. 13, 2004   (KR) ............ 10-2004-0104817

(51) Int. Cl.
    *F21V 7/04*   (2006.01)
(52) U.S. Cl. ............ 362/614; 362/260; 362/561; 362/225; 362/249; 313/607; 313/485; 313/484; 313/487

(58) Field of Classification Search ............ 362/260, 362/561, 560, 249, 600–634; 313/607, 485, 313/484, 487
See application file for complete search history.

(56) References Cited

U.S. PATENT DOCUMENTS

| | | | | |
|---|---|---|---|---|
| 5,889,366 | A | * | 3/1999 | Yokokawa et al. ......... 313/607 |
| 6,152,570 | A | * | 11/2000 | Yokoyama ............ 362/613 |
| 2003/0231512 | A1* | | 12/2003 | Bang et al. .............. 362/560 |
| 2004/0135484 | A1* | | 7/2004 | Lim ...................... 313/234 |
| 2004/0232853 | A1* | | 11/2004 | Hur et al. ............... 315/291 |
| 2005/0127839 | A1* | | 6/2005 | Choi ..................... 313/607 |

* cited by examiner

*Primary Examiner*—Sandra L O'Shea
*Assistant Examiner*—Jessica L McMillan
(74) *Attorney, Agent, or Firm*—McKenna Long & Aldridge LLP

(57) ABSTRACT

An exemplary external electrode fluorescent lamp includes a tube filled with a discharge gas, and a first external electrode on an outer surface of the tube, the first external electrode having a line-like shape. Thus, the exemplary external electrode fluorescent lamp has a reduced non-fluorescent region and an enlarged fluorescent region.

9 Claims, 4 Drawing Sheets

EXTERNAL ELECTRODE FLUORESCENT LAMP, METHOD OF FABRICATING THE SAME AND LIQUID CRYSTAL DISPLAY DEVICE HAVING THE SAME

The present invention claims the benefit of Korean Patent Application No. 2004-0104817 filed in Korea on Dec. 13, 2004, which is hereby incorporated by reference.

BACKGROUND OF THE INVENTION

1. Field of the Invention

The present invention relates to a fluorescent lamp, and more particularly, to an external electrode fluorescent lamp (EEFL), a method of fabricating the same and a liquid crystal display device having the same that have a reduced non-fluorescent region.

2. Discussion of the Related Art

As the information age progresses, flat panel display (FPD) devices having light weight, thin profile, and low power consumption characteristics are being developed and commonly used as substitutes for cathode ray tube (CRT) devices. Generally, display devices may be classified according to their ability for self-emission, and the classification may include emissive display devices and non-emissive display devices. The emissive display devices display images by taking advantage of their ability to self-emit light, and the non-emissive display devices require a light source since they do not emit light by themselves. For example, plasma display panel (PDP) devices, field emission display (FED) devices, and electroluminescent display (ELD) devices are emissive display devices. Liquid crystal display (LCD) devices, which may be categorized as non-emissive display devices, are commonly used in notebook and desktop computers because of their high resolution, capability of displaying color images, and high quality image display.

An LCD module of the LCD device includes an LCD panel for displaying images and a backlight unit for supplying light to the LCD panel. The LCD panel includes two substrates facing and spaced apart from each other, and a liquid crystal layer interposed therebetween. Liquid crystal molecules of the liquid crystal layer have a dielectric constant and refractive index anisotropic characteristics due to their long, thin shape. In addition, two electric field generating electrodes are formed on the two substrates, respectively. Accordingly, an orientation alignment of the liquid crystal molecules can be controlled by supplying a voltage to the two electric field generating electrodes, thereby changing transmittance of the LCD panel based on polarization properties of the liquid crystal molecules. However, since the LCD panel is a non-emissive-type display device, an additional light source is required. Thus, the backlight unit is disposed under the LCD panel. In particular, the LCD panel displays images using light produced by the backlight unit.

In general, backlight units may be classified into edge-type and direct-type according to the disposition of the light source. As display areas of the LCD devices become increasingly large, direct-type backlight units including a plurality of light sources have become commonly used to provide high brightness.

A fluorescent lamp, the light source of the backlight unit, includes a cold cathode fluorescent lamp (CCFL). A CCFL includes an external electrode that extends from an end portion of the glass tube. However, with respect to a large size LCD panel, the CCFL in the edge-type backlight unit fails to provide adequate brightness because it becomes difficult to evenly distribute light to the large size LCD panel. Meanwhile, the CCFL in the direct-type is connected as a parallel arrangement, but the CCFL is not driven using one inverter. Thus, the number of the CCFL limits a proper brightness of the LCD panel. Therefore, a reflector having a predetermined configuration is necessary, and the distance between the diffusion plate and the CCFL is greater for obtaining a uniform brightness. Consequently, a thickness of the LCD panel undesirably increases.

Accordingly, with respect to a large size LCD panel, which demands high brightness and high efficiency, an external electrode fluorescent lamp (EEFL) is suggested, which can provide a long life and a light weight for the LCD panel. The EEFL can be a belt type, a cap type or an expanded type. In an expanded type EEFL, both end portions of the glass tube thereof are swelled out.

FIG. 1 is a schematic view illustrating an EEFL according to the related art. In FIG. 1, a glass tube 14 includes a fluorescent region FR and a non-fluorescent region NFR at a periphery of the fluorescent region FR. In contrast to a CCFL, which includes an external electrode that extends from an end portion of a glass tube, an external electrode 13 is formed on an outer surface of the glass tube 14 in the non-fluorescent region NFR. The external electrode 13 includes a conductive material having a low electric resistance. Although not shown, another external electrode 13 is formed at another end of the glass tube 14, such that the external electrodes 13 respectively function as an anode and a cathode.

FIG. 2 is a schematic cross-sectional view illustrating an LCD device including the EEFL shown in FIG. 1. As shown in FIG. 2, an liquid crystal display (LCD) device includes a liquid crystal display (LCD) panel 18. The LCD panel 18 includes a display region DR and a non-display region NDR, such as a bezel region, at a periphery of the display region DR. The LCD device also includes a lamp-fixing unit 17 connecting the LCD panel 18 and an EEFL 15. In particular, the EEFL 15 is secured by the lamp-fixing unit 17. The EEFL 15 includes a fluorescent region FR and a non-fluorescent region NFR at a periphery of the fluorescent region FR. Specifically, an overlapping portion OLR corresponds to a portion of the non-fluorescent region NFR of the EEFL 15 overlapping the display region DR of the LCD panel 18.

The overlapping region OLR between the non-fluorescent region NFR and the display region DR has a much lower brightness than the center of the display region DR due to the external electrode 13. In particular, the longer the external electrode 13 is, the larger the overlapping region OLR becomes, thereby reducing a regular luminous portion of the display region DR. As a result, the liquid crystal display device according to the related art does not provide uniform brightness, thereby deteriorating image quality.

SUMMARY OF THE INVENTION

Accordingly, the present invention is directed to an external electrode fluorescent lamp, a method of fabricating the same and a liquid crystal display device having the same that substantially obviate one or more of the problems due to limitations and disadvantages of the related art.

An object of the present invention is to provide an external electrode fluorescent lamp, a method of fabricating the same and a liquid crystal display device having the same that have a reduced non-fluorescent region and an enlarged fluorescent region.

Another object of the present invention is to provide an external electrode fluorescent lamp, a method of fabricating the same and a liquid crystal display device having the same that have a high luminous efficiency and a uniform brightness.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an external electrode fluorescent lamp includes a tube filled with a discharge gas, and a first external electrode on an outer surface of the tube, the first external electrode having a line-like shape.

In another aspect, a liquid crystal display device includes a liquid crystal display panel including a display region and a non-display region at a periphery of the display region, and a backlight unit under the liquid crystal display panel, the backlight unit including an external electrode fluorescent lamp and the external electrode fluorescent lamp including a tube filled with a discharge gas, and a first external electrode on an outer surface of the tube, the first external electrode having a line-like shape.

In yet another aspect, a method of fabricating an external electrode fluorescent lamp includes filling a discharge gas in a tube, and forming an external electrode on an outer surface of the tube, the external electrode having a line-like shape.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
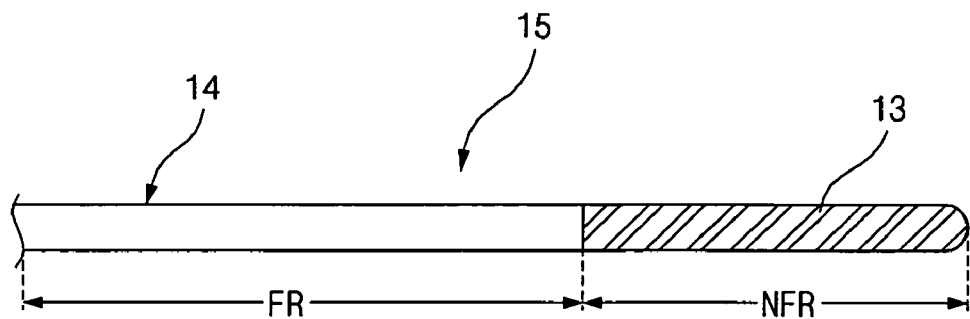
FIG. 1 is a schematic view illustrating an EEFL according to the related art.
Figure 2:
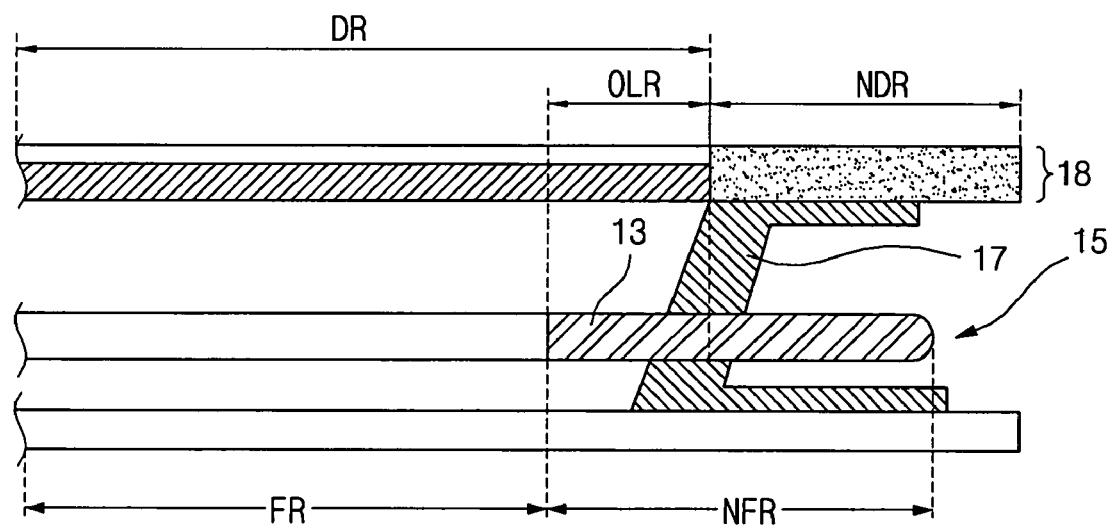
FIG. 2 is a schematic cross-sectional view illustrating an LCD device including the EEFL shown in FIG. 1.
Figure 3A:
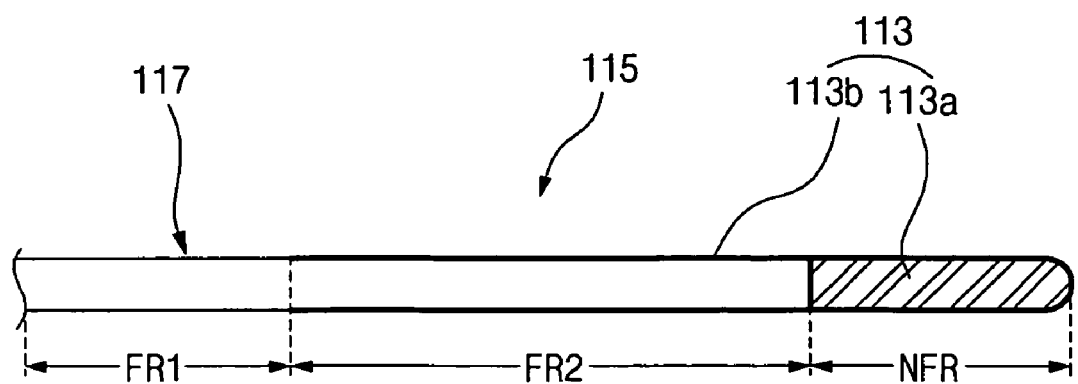
FIGS. 3A and 3B are schematic views illustrating an exemplary EEFL according to an embodiment of the present invention.
Figure 3B:
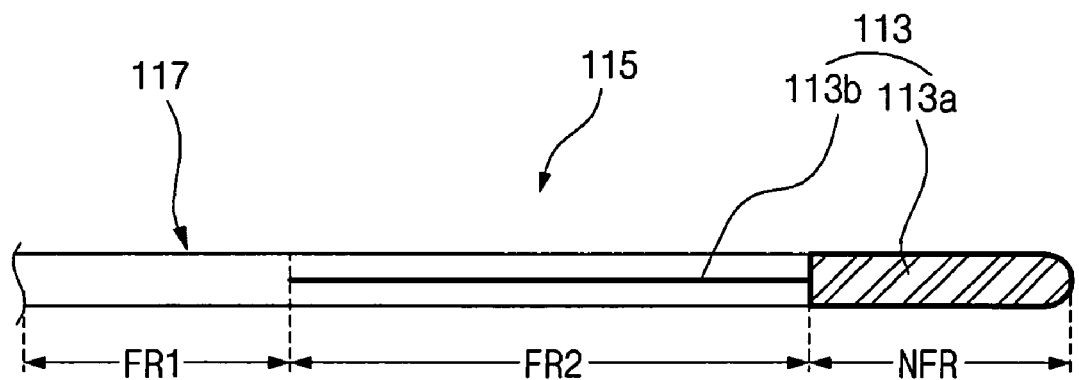

FIGS. 3A and 3B are schematic views illustrating an exemplary EEFL according to an embodiment of the present invention. FIG. 3A is a schematic front view of an EEFL, and FIG. 3B is a schematic cross-sectional view of the EEFL shown in FIG. 3A. In FIG. 3A, an EEFL 115 includes a tube 117 filled with a discharge gas, and an external electrode 113 disposed on an outer surface of an end portion of the tube 117. The tube 117 has a first fluorescent region FR1, a second fluorescent region FR2 adjacent to the first fluorescent region FR1, and a non-fluorescent region NFR at a periphery of the second fluorescent region FR2. The tube 117 may be a glass tube, and the discharge gas may include mercury (Hg) and an inert gas, such as neon (Ne) and argon (Ar).

The external electrode 113 is disposed on the outer surface of the tube 117 in the second fluorescent region FR2 and the non-fluorescent region NFR. The external electrode 113 may be formed of a conductive material having a low electric resistance, for example, aluminum (Al), silver (Ag) and copper (Cu). Although not shown, an additional external electrode 113 may be disposed on an outer surface of another end portion of the tube 117, such that one of the external electrodes 113 functions as an anode and another of the external electrodes 113 functions as a cathode. In particular, a distance between the two external electrodes 113 may be preferably determined to prevent an overload.

The external electrode 113 includes a first external electrode 113a and a second external electrode 113b. The first external electrode 113a is in the non-fluorescent region NFR and has a cap-like shape. Thus, the cap-like shaped first external electrode 113a is formed in only a region that does not affect brightness of an LCD panel. Moreover, the second external electrode 113b is in the second fluorescent region FR2 and has a line-like shape. As shown in FIG. 3A, the second external electrode 113b may include two lines formed parallel to each other and along a lengthwise direction of the tube 117, such that in a cross-sectional view shown in FIG. 3B, the second external electrode 113b appears as one line.

Accordingly, light is only partially blocked in the second fluorescent region FR2 of the EEFL 115 due to the thin profile of the line-like shaped second external electrode 113b. Although not shown, the second external electrode 113b may have a curved-line shape and may have any length so long as it is capable of maintaining minimum energy to excite an electron. Thus, a luminous region of the EEFL 115 is increased while a length of the external electrode 113 is not reduced, thereby increasing luminous efficiency.

Although not show, a method of fabricating the EEFL 115 includes filling a discharge gas in the tube 117 and forming the external electrode 113 on the outer surface of the tube 117. In particular, the external electrode 113 may be formed by attaching a metallic tape on the outer surface of the tube 117. The metallic tape may have a shape complementary to the resultant shape of the external electrode 113. Then, the tube 117 including the metallic tape is dipped in a metallic solution. Subsequently, the metallic tape is removed from the tube 117 after dipping to form the external electrode 113. Thus, the metallic tape may be attached to the tube 117 except at a formation region of the external electrode 113 prior to dipping the tube 117 in the metallic solution. In addition, the tube 117 may undergo additional processes, such as a phosphor/fluorescent material coating process.

Figure 4:
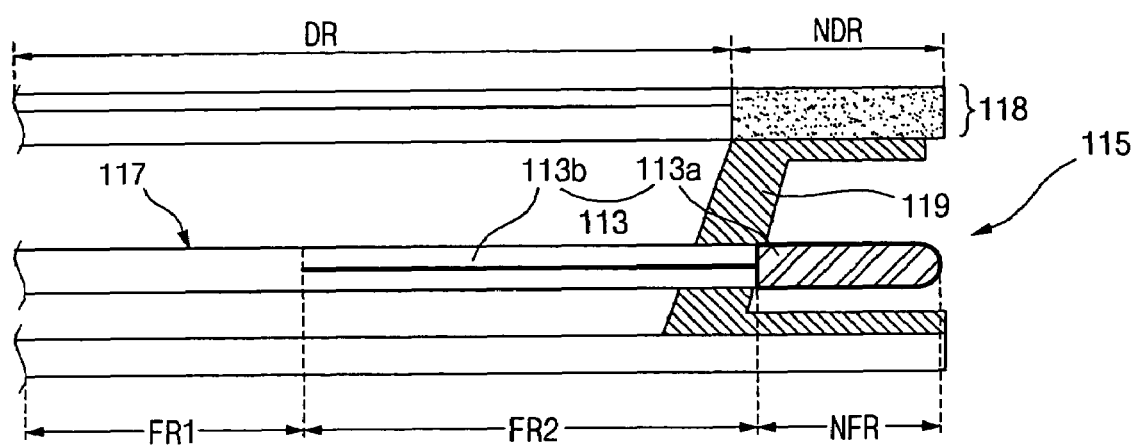
FIG. 4 is a schematic cross-sectional view illustrating an LCD device including the EEFL shown in FIGS. 3A and 3B.

FIG. 4 is a schematic cross-sectional view illustrating an LCD device including the EEFL shown in FIGS. 3A and 3B. As shown in FIG. 4, a LCD device includes a LCD panel 118 including an display region DR and a non-display region NDR, such as a bezel region at a periphery of the display region DR, and a backlight unit (not shown) under the LCD panel 118. The backlight unit includes the EEFL lamp 115 shown in FIGS. 3A and 3B.

For example, the EEFL lamp 115 includes a tube 117 filled with a discharge gas, the tube 117 having a first fluorescent region FR1, a second fluorescent region FR2 adjacent to the first fluorescent region FR1, and a non-fluorescent region NFR at a periphery of the second fluorescent region FR2. The first fluorescent region FR1 and a portion of the second fluorescent region FR2 correspond to the display region DR, and the remaining portion of the second fluorescent region FR2 and the non-fluorescent region NFR correspond to the non-display region NDR. The external electrode 113 is disposed on an outer surface of the tube 117 in the second fluorescent region FR2 and the non-fluorescent region NFR. The external electrode 113 includes a cap-like shaped first external electrode 113a and a line-like shaped second external electrode 113b.

The EEFL 115 is fixed to the LCD panel 118 by a lamp-fixing unit 119 between the LCD panel 118 and the EEFL 115. The lamp-fixing unit 119 corresponds to the non-display region NDR. Since a length of the line-like shaped second external electrode 113b can be extended into the display region DR of the LCD panel 118, a length of the cap-like shaped first external electrode 113a can be reduced, thereby increasing a display region DR of the LCD panel 118. Accordingly, the non-display region NDR can be reduced due to reduction of the first external electrode 113a.

Although not shown, two external electrodes 113 may be disposed at both end portions of the tube 117, one acting as an anode and another acting as a cathode. Furthermore, since a distance between the anode and the cathode is closer than the external electrode 113 without the line-like shaped external electrode, electric field between the anode and the cathode is strong and the length of the external electrode 113 is extended. Therefore, brightness in the center portion of the EEFL 115 is increased. In addition, plasma ions (not shown) are concentrated in a portion of the external electrode 113, wherein the length of the external electrode 113 is increased. The luminous efficiency of the EEFL 115 is increased by distributing the plasma ions around the external electrode 113.

In addition, since the second external electrode 113b of the line shape is disposed in the second fluorescent region FR2, transmittance can be improved with respect to the LCD panel 118. Accordingly, brightness with respect to a whole surface of the display region DR displaying an image can be increased.

Although not shown, the LCD panel 118 includes first and second substrates facing each other and a liquid crystal layer interposed between the first and second substrates, and the backlight unit further includes a reflector under the EEFL 115, a light guide plate adjacent to the EEFL 115, and a plurality of optical films between the LCD panel 118 and the EEFL 115. It is noted that the cap type external electrode is formed in only a region that does not affect brightness of the LCD panel 118.

Figure 5A:
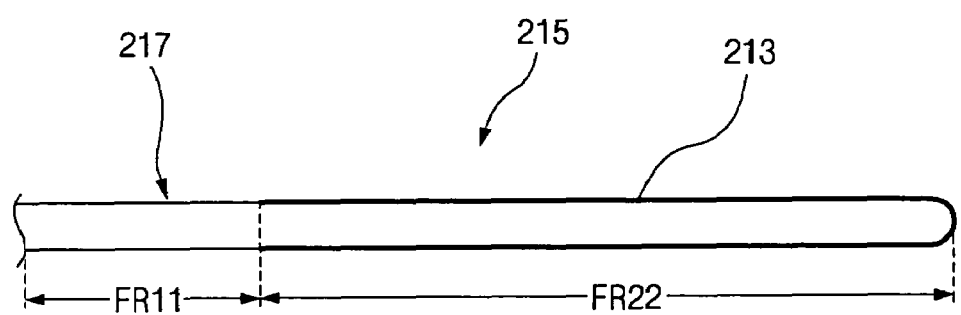
FIGS. 5A and 5B are schematic views illustrating an exemplary EEFL according to another embodiment of the present invention.
Figure 5B:
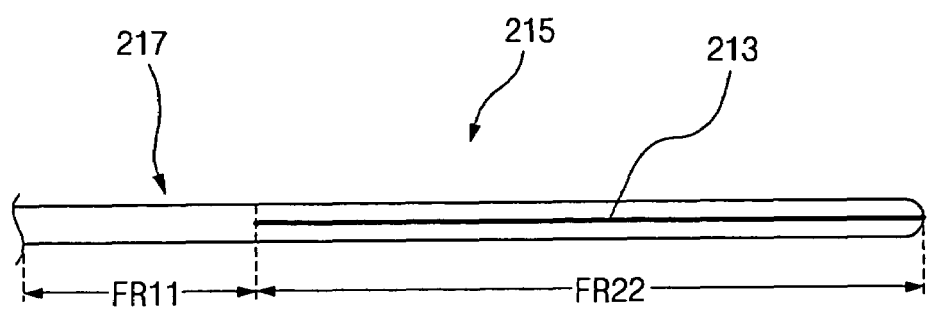

FIGS. 5A and 5B are schematic views illustrating an exemplary EEFL according to another embodiment of the present invention. FIG. 5A is a schematic front view of an EEFL, and FIG. 5B is a schematic cross-sectional view of the EEFL shown in FIG. 5A. In FIG. 5A, an EEFL 215 includes a tube 217 filled with a discharge gas, and an external electrode 213 disposed on an outer surface of an end portion of the tube 217. The tube 217 has a first fluorescent region FR11 and a second fluorescent region FR22 at a periphery of the first fluorescent region FR11. The tube 217 may be a glass tube, and the discharge gas may include mercury (Hg) and an inert gas, such as neon (Ne) and argon (Ar).

The external electrode 213 is disposed on the outer surface of the tube 217 in the second fluorescent region FR22. The external electrode 213 may be formed of a conductive material having a low electric resistance, for example, aluminum (Al), silver (Ag) and copper (Cu). Although not shown, an additional external electrode 213 may be disposed on an outer surface of another end portion of the tube 217, such that one of the external electrodes 213 functions as an anode and another of the external electrodes 213 functions as a cathode. In particular, a distance between the two external electrodes 213 may be preferably determined to prevent an overload.

In addition, the external electrode 213 has a line-like shape. As shown in FIG. 5A, the external electrode 213 may include two lines formed parallel to each other and along a lengthwise direction of the tube 217, such that in a cross-sectional view, shown in FIG. 3B, the external electrode 213 appears as one line. In particular, the external electrode 213 may have a curved-line portion corresponding to a curved outer surface at an end portion of the tube 217.

Accordingly, light is only partially blocked in the second fluorescent region FR22 of the EEFL 215 due to the thin profile of the line-like shaped external electrode 213. Further, because the external electrode 213 includes only a line-like shape and does not have a cap-like shape portion, the EEFL 215 emits even more light, thereby increasing an available brightness region of a LCD panel 218. Although not shown, the external electrode 213 may have a curved-line shape and may have any length so long as it is capable of maintaining minimum energy to excite an electron. Thus, a luminous region of the EEFL 215 is increased while a length of the external electrode 213 is not reduced, thereby increasing luminous efficiency.

Although not shown, a method of fabricating the EEFL 215 includes filling a discharge gas in the tube 217 and forming the external electrode 213 on the outer surface of the tube 217. In particular, the external electrode 213 may be formed by attaching a metallic tape on the outer surface of the tube 217. The metallic tape may have a shape complementary to the resultant shape of the external electrode 213. Then, the tube 217 including the metallic tape is dipped in a metallic solution. Subsequently, the metallic tape is removed from the tube 217 after dipping to form the external electrode 213. Thus, the metallic tape may be attached to the tube 217 except at a formation region of the external electrode 213 prior to dipping the tube 217 in the metallic solution. In addition, the tube 217 may undergo additional processes, such as a phosphor/fluorescent material coating process.

Figure 6:
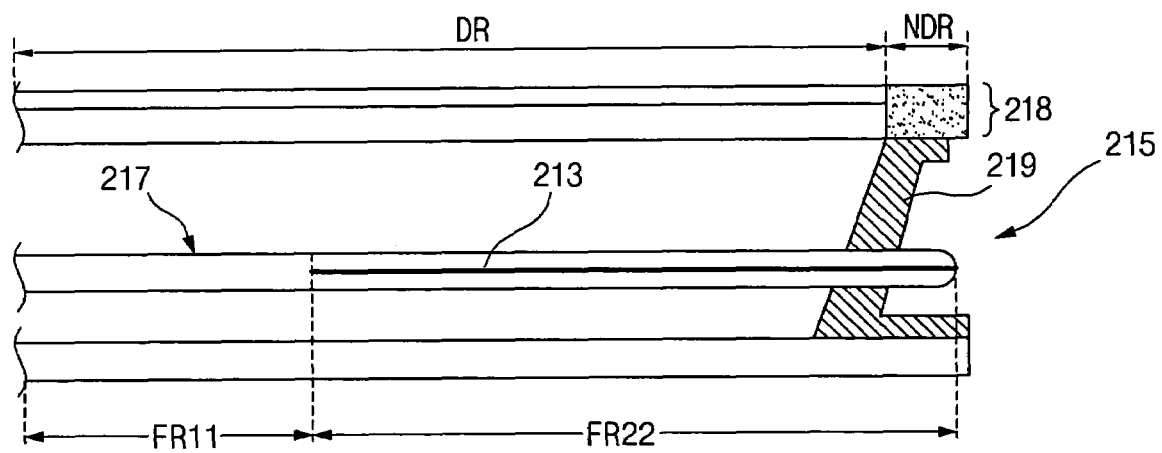
FIG. 6 is a schematic cross-sectional view illustrating an LCD device including the EEFL shown in FIGS. 5A and 5B.

FIG. 6 is a schematic cross-sectional view illustrating an LCD device including the EEFL shown in FIGS. 5A and 5B. As shown in FIG. 6, a LCD device includes a LCD panel 218 including an display region DR and a non-display region NDR, such as a bezel region, at a periphery of the display region DR, and a backlight unit (not shown) under the LCD panel 218. The backlight unit includes the EEFL lamp 215 shown in FIGS. 5A and 5B.

For example, the EEFL lamp 215 includes a tube 217 filled with a discharge gas, the tube 217 having a first fluorescent region FR11 and a second fluorescent region FR22 at a periphery of the first fluorescent region FR11. The first fluorescent region FR11 corresponds to a center portion of the display region DR, and the second fluorescent region FR22 corresponds to the remaining portion of the display region DR and the non-display region NDR. The external electrode 213 is disposed on an outer surface of the tube 217 in the second fluorescent region FR22. The external electrode 213 includes only a line-like shape.

The EEFL 215 is fixed to the LCD panel 218 by a lamp-fixing unit 219 between the LCD panel 218 and the EEFL 215. The lamp-fixing unit 219 corresponds to the non-display region NDR.

Since the external electrode 213 is in a line-like shape in the second fluorescent region FR22, the non-display region NDR, such as a bezel region, can be more reduced than those of the EEFL 115 shown in FIGS. 3A and 3B. Therefore, the available region of the display region DR can be increased even more. Further, since transmittance efficiency of the EEFL 215 is improved, the entire brightness of the LCD panel 218 is also improved. In addition, plasma ions are concentrated in a portion of the external electrode, wherein the length of the external electrode 213 is increased. The luminous efficiency of the EEFL 215 is increased by distributing the plasma ions around the external electrode 213.

Accordingly, an EEFL according to an embodiment of the present invention can provide an increased available region of the display region by reducing the non-display region of a LCD panel. In addition, brightness of a center portion of an EEFL according to an embodiment of the present invention increases due to a long profile of an external electrode thereof, a luminous efficiency of the EEFL increases by distributing the plasma ions around the external electrode.

It will be apparent to those skilled in the art that various modifications and variations can be made in the external electrode fluorescent lamp, the method of fabricating the same and the liquid crystal display device having the same of the present invention without departing from the spirit or scope of the invention. Thus, it is intended that the present invention covers the modifications and variations of this invention provided they come within the scope of the appended claims and their equivalents.

What is claimed is:

1. A liquid crystal display device, comprising:
 a liquid crystal display panel including a display region and a non-display region at a periphery of the display region; and
 a backlight unit under the liquid crystal display panel, the backlight unit including an external electrode fluorescent lamp and the external electrode fluorescent lamp including:
  a tube filled with a discharge gas, the tube including a top portion facing the liquid crystal display panel, a bottom portion opposite to the top portion, and a side portion between the top and bottom portions; and
  a first external electrode on an outer surface of the tube, the first external electrode having a line-like shape and being disposed symmetrically on the side portion of the tube without covering the top portion,
 wherein the tube has a fluorescent region, a partial fluorescent region immediately adjacent to the fluorescent region and a non-fluorescent region immediately adjacent to the partial fluorescent region, and the first external electrode is in the partial fluorescent region.

2. The device according to claim 1, further comprising:
 a second external electrode in the non-fluorescent region and being electrically connected to the first external electrode.

3. The device according to claim 2, wherein the second external electrode has a cap-like shape.

4. The device according to claim 1, wherein the line-like shape includes one of a straight-line shape and a curved-line shape.

5. The device according to claim 1, wherein the first external electrode is along a lengthwise direction of the tube.

6. The device according to claim 1, further comprising a lamp-fixing unit for securing the external electrode fluorescent lamp to the liquid crystal display panel.

7. The device according to claim 1, wherein the liquid crystal display panel includes first and second substrates facing each other and a liquid crystal layer interposed between the first and second substrates.

8. The device according to claim 1, wherein the backlight unit further includes a reflector under the external electrode fluorescent lamp, a light guide plate adjacent to the external electrode fluorescent lamp, and a plurality of optical films between the liquid crystal display panel and the external electrode fluorescent lamp.

9. A liquid crystal display device, comprising:
 a liquid crystal display panel including a display region and a non-display region at a periphery of the display region; and
 a backlight unit under the liquid crystal display panel, the backlight unit including an external electrode fluorescent lamp and the external electrode fluorescent lamp including:
  a tube filled with a discharge gas, the tube including a top portion facing the liquid crystal display panel, a bottom portion opposite to the top portion, and a side portion between the top and bottom portions; and a first external electrode on an outer surface of the tube, the first external electrode having a line-like shape and being disposed symmetrically on the side portion of the tube without covering the top portion,
 wherein the tube has a first fluorescent region and a second fluorescent region at a periphery of the first fluorescent region, and the first external electrode is along a lengthwise direction of the tube in the second flourescent region and extends into the first flourescent region.

* * * * *